United States Patent [19]

Märkl

[11] 4,006,320

[45] Feb. 1, 1977

[54] FAULT LOCATING SYSTEM AND METHOD FOR TRANSMISSION LINES AND REPEATER STATIONS

[75] Inventor: Georg Märkl, Nurnberg, Germany

[73] Assignee: Tekade Felten & Guilleaume Fernmeldeanlagen GmbH, Nurnberg, Germany

[22] Filed: July 25, 1975

[21] Appl. No.: 598,996

[30] Foreign Application Priority Data

July 27, 1974 Germany .......................... 2436373

[52] U.S. Cl. .................... 179/175.31 R; 179/15 BF
[51] Int. Cl.² .......................................... H04B 3/46
[58] Field of Search ............. 179/175.31 R, 170 F, 179/15 BF, 15 AD, 15 AL; 178/71 T

[56] References Cited

UNITED STATES PATENTS

| 3,560,670 | 2/1971 | Heyes | 179/175.31 R |
| 3,909,563 | 9/1975 | Ghosh | 179/175.31 R |

FOREIGN PATENTS OR APPLICATIONS

| 278,262 | 1/1965 | Australia | 179/175.31 R |
| 1,064,592 | 4/1967 | United Kingdom | 179/175.31 R |

*Primary Examiner*—David L. Stewart
*Attorney, Agent, or Firm*—Michael J. Striker

[57] ABSTRACT

A communication system has at least one supervisory station and a large number of repeater stations spaced along a four-wire two-way transmission line. A number of repeater stations are selected at equal intervals along the line to have a coupling network coupling test signals from the first pair of wires in the transmission line to the second pair of wires which differs from the coupling network of the remainder of the repeater stations. To locate a fault, test signals in the form of pulses are sent from the supervisory station to the repeater stations. At each repeater station, if operative, the received test signals are coupled to the second pair of wires for retransmission back to the supervisory station. In view of the differences in the coupling networks, the test signals returned from the selected repeater stations will have a difference in, for example, amplitude which, when the returned test signals are displayed at the supervisory station can serve as markers to divide the repeater stations into groups and to determine the group containing the repeater station or line segment having a fault. The group containing the repeater station or line segment having a fault can then be displayed on the oscillograph on an expanded scale allowing ready determination of the segment or repeater station having the fault.

20 Claims, 6 Drawing Figures

FAULT LOCATING SYSTEM AND METHOD FOR TRANSMISSION LINES AND REPEATER STATIONS

BACKGROUND OF THE INVENTION

The present invention relates to fault locating systems and methods for four-wire communication networks having at least one supervisory station and a plurality of unmanned repeater stations. In known apparatus of this type, test signals generally in the form of pulses are sent from the supervisory station through a pair of wires to all of the repeater stations. In each of the repeater stations an electrical network couples test signals from the first pair of wires to the second pair of wires so that said test signals received at a repeater station are transmitted back to the supervisory station. On the basis of missing return signals it is then possible to locate the line segment or the repeater station which is inoperative. Such a method and arrangement is described in U.S. Pat. No. 3,312,791. In this known method and arrangement a pulse-amplitude modulated frequency outside of the communication frequencies is utilized as test signal. At each individual repeater station, the network connecting the output of the amplifier connected to the first pair of wires to the input of the amplifier connected to the second pair of wires is a filter which blocks the communication signals and passes only signals of the frequency associated with the test signals. The same filters are used in all of the repeater stations and are therefore readily interchangeable. Because of the difference in distance between individual repeater stations and the supervisory station, the returning test signals looped via each repeater station arrive at different times back at the supervisory station, so that actually a pulse sequence is received at the supervisory station in response to each pulse sent out as a test signal. This pulse sequence is displayed on an oscillograph so that the number of returned pulses can be counted. Thus for example if one supervisory station supervises m repeater stations and the number of returned pulses is only equal to q where q is less than m, then the fault exists at the $(q+1)$th repeater station as counted from the supervisory station.

This system and method works well when a relatively small number of repeater stations is supervised by one supervisory station. Under these conditions the number of returned signals can readily be counted on the screen of the oscillograph. However when one supervisory station supervises a very large number of repeater stations, such a display becomes very difficult to read. Thus for example for a single supervisory station which supervises more than forty repeater stations as is often the case for carrier frequency systems having a large number of channels and a small distance between repeater stations, the display becomes almost impossible to read since the pulses are spaced so closely to each other that it is difficult or impossible to arrive at the correct count.

SUMMARY OF THE INVENTION

It is an object of the present invention to furnish an improved fault locating arrangement and method of the above-described type wherein the display can also be readily read when a large number of repeater stations are supervised by a single supervisory station. In accordance with the present invention a small number, p, of selected repeater stations spaced at substantially equal intervals among the remainder of the repeater stations each have a first coupling network for coupling the first pair of wires to the second pair of wires of the transmission line, the first coupling network each having a first electrical characteristic. The remainder of the repeater stations each have a second coupling network for coupling the first pair of wires to the second pair of wires of the transmission line, the second coupling network each having a second electrical characteristic, the second electrical characteristic being different from the first electrical characteristic. At the supervisory station, a test signal furnishing means are present which apply a sequence of test signals to said first pair of wires for transmission to said repeater stations. Since the electrical characteristic of the first coupling networks at the selected repeater stations differs from that of the second coupling networks at the remainder of the repeater stations, the pulses looped via the selected repeater stations and returning on the second pair of wires of the transmission system will have a different characteristic value (e.g. amplitude) than the returning pulses looped wire the remainder of the repeater stations in response to the same test signal. Receiver means at the supervisory station then receive the return pulses which will include pulses of a different (larger in a preferred embodiment of the present invention) amplitude at regular intervals. The pulses of larger amplitude divide the return pulses into groups. The larger amplitude pulses are readily counted. The oscillograph is then adjusted to display only the group of pulses wherein a fault is present, that is the group of pulses following the last-received one of the pulses having the increased amplitude. The individual repeater station having the fault can then be readily isolated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
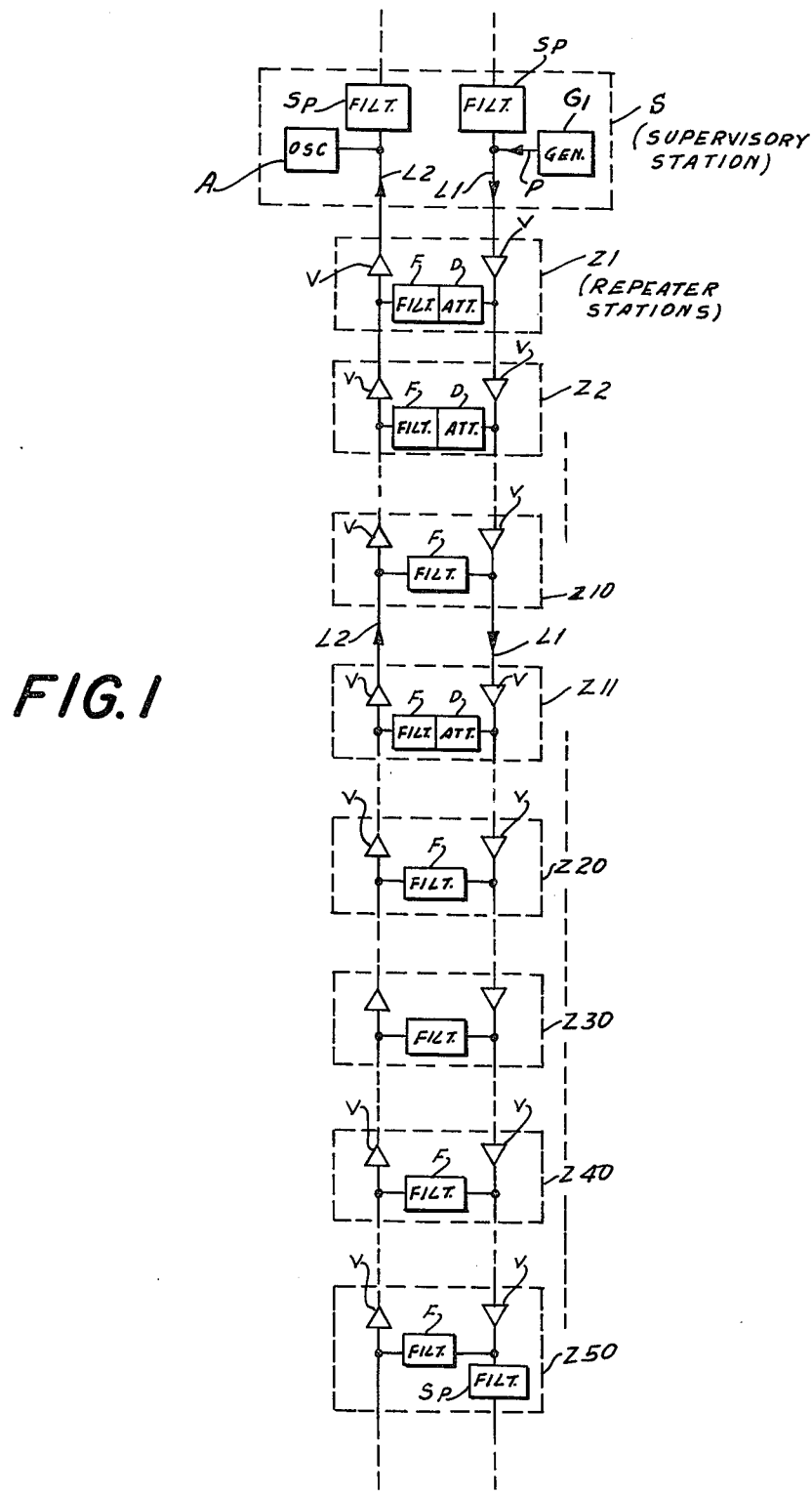
FIG. 1 is a schematic diagram illustrating a four-wire transmission system having an individual supervisory station supervising a large plurality of repeater stations and wherein the coupling network coupling the first pair of wires to the second pair of wires at selected repeater stations has a damping factor different from the damping factor of the coupling network of the remainder of the repeater stations.

A preferred embodiment of the present invention now be described with reference to the drawing.

FIG. 1 shows an embodiment of the present invention wherein the system and method of the present invention is utilized in a communication system having a single supervisory station, indicated by S, and fifty repeater stations Z1 . . . Z50. Both the supervisory station S and the last of the repeater stations Z50, have a filter Sp for preventing signals of the frequency of the test signal from entering other portions of the communication system. The test signal furnishing means are denoted by $G_1$ in FIG. 1. The test The test signal furnishing means furnish a test signal P being a pulsed frequency to line L1 which is the line for transmitting signals from the supervisory station to the repeater stations. Each of the repeater stations have a coupling network which couples the test signal P at the output of amplifier V in line L1 to the input of the amplifier V which furnishes return signals via line L2 to the supervisory station. Selected ones of the repeater stations, for example every tenth station, that is stations Z10, Z20, etc. as shown in the Figure, have a coupling network whose damping factor differs from the damping factor of the coupling networks of the remainder of the repeater stations. In the embodiment shown in FIG. 1, all repeater stations have the same filter F, for example a bandpass filter which rejects frequencies of the communications band and passes the frequency associated with the test signal, each of the filters F having a damping network D associated therewith except for the filters at stations Z10, Z20, Z30, Z40 and Z50. The fifty repeater stations are thus divided into $p=5$ groups each of which contains $n=10$ repeater stations. If it is impossible to divide the total number of repeater stations into groups each of which contain the same number of repeater stations, the number of repeater stations in one group may of course differ from the number of repeater stations in other groups. Thus for example if no integral result can be obtained when the total number of repeater stations is divided by the number of groups, it is necessary to make such an arrangement. Thus, if the total number of repeater stations is 47 and five groups are formed, each of the first four groups can have eight repeater stations while the last group contains only seven. There may be other reasons for dividing into groups which do not have equal numbers of associated repeater stations. It will become apparent that this will cause no difficulty in the various preferred embodiments of the present invention.

To return to FIG. 1, each filter F allows only the passage of the test signal from line L1 to line L2. If all repeater stations Z1 . . . Z50 are operative and if there is no fault in the line segments between the repeater stations, and between the first repeater station respectively and the supervisory station, individual test signal p will result in an individual return signal from each repeater station which is received on line L2 at the supervisory station at time intervals corresponding to the time interval required for the test signal to travel from one repeater station to the next and to return. If all repeater stations Z1 . . . Z50 and line segments are operative, a single test signal applied to line L1 will result in a sequence of fifty return signals received on line L2. The so-received signals are applied to receiving means denoted by A which, in a preferred embodiment of the present invention comprise an oscillograph. In accordance with the present invention, the horizontal frequency of the oscillograph is frist set so that all return pulses generated in response to a single test signal are displayed during one horizontal sweep. Thus all 50 return signals will be displayed.

Figure 2:
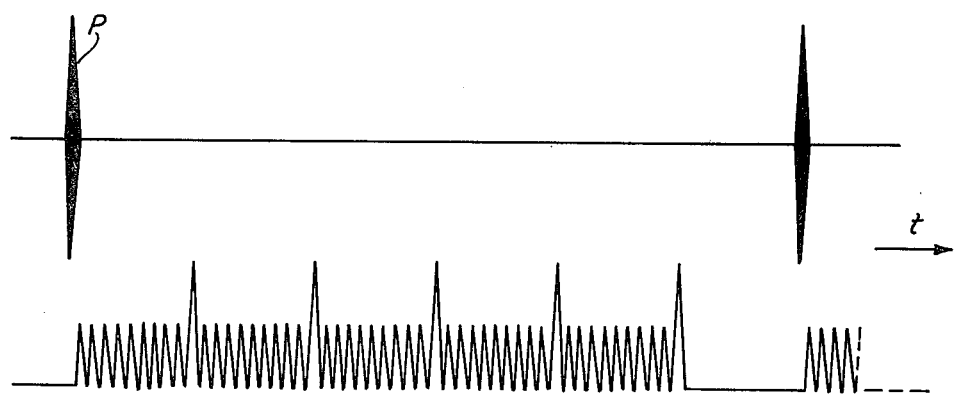
FIG. 2 is a timing diagram showing an individual test signal and the resultant sequence of return signals at the supervisory station.

This situation is demonstrated in FIG. 2 where the transmitted test signals are pictured on the top line while the return signals as displayed on the oscillograph are pictured on the lower line. It will be noted that, since each tenth repeater station does not include the damping network D, the five pulses received from each of these selected repeater stations have an amplitude of the return signals from the remainder of the repeater stations. These five pulses can therefore be readily counted. It should be noted that the signals shown on the lower line of FIG. 2 are signals which are displayed after first having been rectified.

Let it now be assumed that a fault exists at the thirty-eighth repeater station. Accordingly, the sequence of pulses in the lower line of FIG. 2 would be terminated after the thirty-seventh pulse and would contain only three of the pulses having the larger amplitude. It is thus very simple to determine that the fault lies in a repeater station in the .(3+1)th group of repeater stations. Thus it may be generalized: when the display of the sequence of returned signals contains h pulses of higher amplitude, the repeater station having the fault is associated with the ($h+1$)th group of repeater stations.

Figure 3:
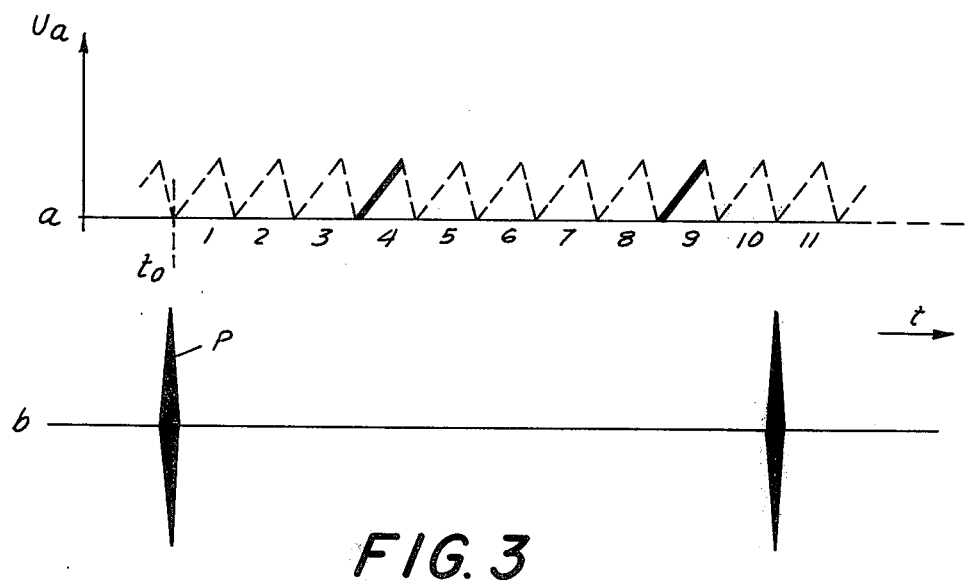
FIG. 3 illustrates the time relationship between the transmitted test signal and the deflection voltage of the horizontal deflection circuit in the oscillograph.

It is now necessary to determine the exact repeater station at which the fault occurred. This is accomplished in a second step of the method of the present invention. For this step, the frequency of the horizontal sweep generator of the oscillograph is increased by a factor p equal to the number of groups into which the total number of repeater stations was divided. Simultaneously, an electronic counter which is synchronized to the test signal and therefore of course to the horizontal sweep generator, selects the fourth, ninth, fourteenth, etc. sawtooth from the sequence of sawtooth voltages furnished by the horizontal sweep generator. Only the so-selected sawtooth voltages are applied to the horizontal deflection system, no deflection taking place during the remainder of the time. This is indicated in FIG. 3 where the ordinate of the top line $a$ represents voltage amplitude while the abscissa represents time. Shown in the top line $a$ is the deflection voltage $U_a$ with the suppressed deflection signals indicated by dashed lines while the selected deflection signals are indicated by solid lines. Line $b$ of FIG. 3 shows the test signals. The following general rule results: if the repeater station having the fault belongs to the kth group of a total of p groups, then the kth, ($k+p$)th, ($k+2p$)th, etc. sawtooth is to be applied to the deflection system. The electronic counter is reset for each test signal. Alternatively, an internal resetting after p sawtooths would also be possible.

Figure 4:
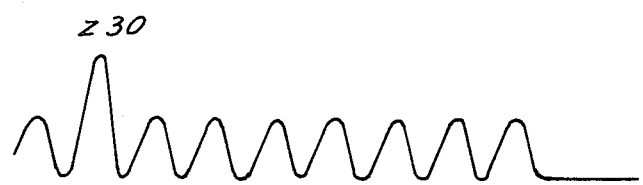
FIG. 4 illustrates the oscillogram during the second stage of fault locating.

It is readily evident that the second step in the analysis of the return pulses causes only the group including the repeater station having the fault to be displayed, that is only the pulses associated with this one particular group are displayed on the oscillograph. Thus in accordance with the present invention it is possible to correctly locate the fault in one of a plurality of repeater stations where this would not have been possible due to lack of resolution of the oscillograph for the known method wherein the pulses of diffferent amplitude from selected repeater stations are not utilized. This is because the individual group having only some few repeater stations is separately analyzed and therefore requires less resolution. As shown in FIG. 4, the large pulse denoted by Z30 is followed by seven smaller pulses which were returned from repeater stations Z31 . . . Z37. Pulse Z30 thus serves as a marker. For this reason it is not essential that the beginning of the deflection of the oscillograph is exactly synchronized to the return pulses. Even if one or two pulses which are associated with the previous group of repeater stations appears on the left side of the oscillograph, the higher amplitude pulse Z30 serves as a clear indication where the count for the particular group is to begin. If the oscillograph is thus not synchronized exactly and it is desired to provide a display of a group of repeater stations which do not include a faulty repeater station, it is required that the horizontal deflection frequency be set in such a manner that $n+1$ pulses will be shown on the screen.

In a further preferred embodiment of the present invention the damping network D is associated within the remainder of the repeater stations and not with the selected ones of the repeater stations. The test signals via the selected ones of the repeater stations will then be smaller than the remainder of the pulses.

Figure 5:
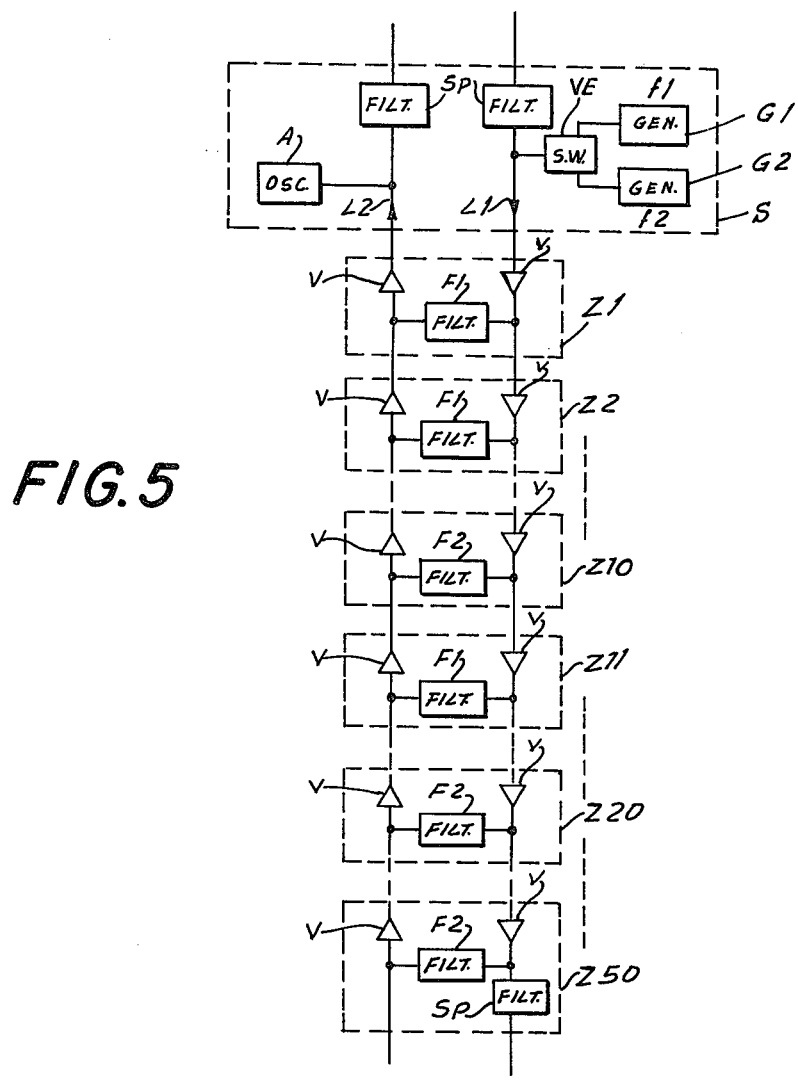
FIG. 5 is a schematic diagram showing the supervisory station and repeater stations in a communications system wherein the coupling networks in the selected repeater stations have a passing frequency differing from the frequency passed by the coupling networks in the remainder of the repeater stations.
Figure 6:
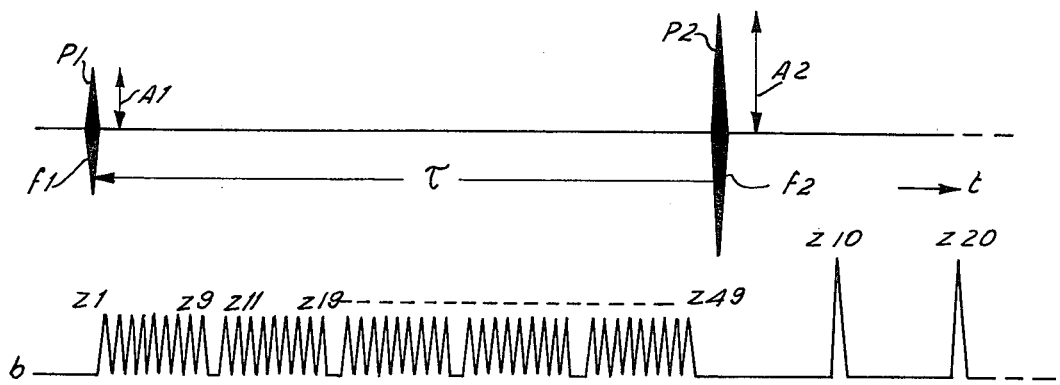
FIG. 6 is a timing diagram showing the test signal and the resultant sequence of returned signals for the system of FIG. 5.

In a further preferred embodiment of the present invention the first coupling means, namely the coupling network associated with the selected repeater stations Z10, Z20, etc. have a passing frequency differing from that of the coupling network of the remainder of the repeater stations rather than a different attenuation value. For example, as shown in FIG. 5, the first coupling networks, namely the networks associated with repeater stations Z10, Z20, etc. include a filter F2 for passing test signals having the frequency F2 but rejecting test signals of frequency F1. The test signals P2 shown in FIG. 6 will be passed by filters F2. These test signals have an amplitude A2 which exceeds the amplitude A1 of the test signals P1 passed by the filters F1 associated with the remaining ones of the repeater stations. As shown in FIG. 6, line $a$, signals P1 and P2 are transmitted alternately. Specifically, as shown in FIG. 5, signal P1 is furnished by a generator G1 while signal P2 is furnished by a generator G2. A switching arrangement indicated as UE alternately connects either generator G1 or generator G2 to line L1. The time interval $\tau$ between pulses P1 and P2 or between pulses P2 and P1 is such that sufficient time exists for a signal to travel from the supervisory station to the further repeater station and back again to the supervisory station.

The oscillographic display resulting from the returned signal generated by the alternately applied test signal, after rectification of the return signals, results in the two different alternating images shown in FIG. 6, line $b$. The test signals resulting in these images are shown in FIG. 6, line $a$ where P1 refers to the test signal having frequency F1 while P2 refers to the test signal having frequency F2. The time interval between the two signals is denoted by $\tau$. The pulses $z1 \ldots z9, z11 \ldots Z19$, etc. are the return signals resulting from the test signal P1, while the pulses $z10, z20$, etc. having a larger amplitude result from the transmission of test signal P2. When the test signals are transmitted at a sufficiently high frequency, the resulting image on the screen comprises the two alternating images superimposed on each other so that the resulting visual pattern would correspond to that shown in FIG. 2 and the pulses P2 have an amplitude A2 which exceeds the amplitude A1 of the pulses P1. The second step in the method of the present invention, namely the expansion of the return signals associated with the group having the malfunctioning repeater station is effected as discussed with reference to FIG. 2 by increasing the oscillator frequency in the horizontal sweep circuits of the oscillograph by the factor $p$.

In a further preferred embodiment of the method of the present invention, only the test signal P2 is transmitted for the first step, namely the step wherein normally all of the return signals would be displayed. For this condition, only the pulses $z10, z20$, etc. would appear on the screen. For the second step only the test signal P1 is transmitted. The increase of the horizontal sweep frequency of the oscillograph and the selection of the particular sawtooth corresponding to the group having a malfunctioning repeater station would be carried out as above.

In a further preferred embodiment of the present invention test signals P1 and P2 are transmitted with the same amplitude and are separated at the receiver by two filters tuned to the corresponding frequencies. At the receiver, that is at the supervisory station S, the soseparated test signals are then subjected to different amplification. This does require somewhat more equipment than the embodiment wherein the test signals are transmitted originally at different amplitudes.

If frequencies f1 and f2 of test signals P1 and P2 are sufficiently widely spaced from each other so that no interaction resulting in oscillations can occur, these two test signals can be transmitted simultaneously. The general method in accordance to the present invention is not changed by such simultaneous transmission. A further variation of the method utilizing test signals P1 and P2 having different frequencies consists in separating the return signals in accordance with their frequency and then rectifying one with one polarity and the other with the contrary polarity prior to applying the signals to the oscillograph. Thus test signals P1 can, for example, be displayed as extending upwards while the return signals resulting from test signal P2 would extend downwards from the zero amplitude line. Such a difference in the polarity of the pulses created in response to test signals P1 and P2 results in a particularly clear presentation, that is the return signals from the selected ones of the repeater stations serve as very readily visible markers in this particular embodiment of the invention.

While the invention has been illustrated and described as embodied in specific methods and arrangements for creating marker signals separating the return signals from the repeater stations into groups, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of locating a fault in a four-wire two-way communications system comprised of a supervisory station, a four-wire transmission path leading away from the supervisory station, and a plurality of repeater stations spaced along the transmission path, the plurality of repeater stations being comprised of a lesser number of first repeater stations and a greater number of second repeater stations, the first repeater stations being interspersed among the second repeater stations, the method comprising, in combination, the steps of: at each first repeater station connecting between the outgoing and incoming lines a respective one of a plurality of first coupling networks each having the same first transfer function; at each second repeater station connecting between the outgoing and incoming lines a respective one of a plurality of second coupling networks each having the same second transfer function, different from the first transfer function; producing a waveform comprised of first pulses and distinguishable second pulses, the first pulses being interspersed among the second pulses in correspondence to the interspersing of the first repeater stations among the second repeater stations, the producing of the first pulses comprising applying a single test pulse to the outgoing line at the supervisory station and deriving all the first pulses from such single test pulse by permitting the single test pulse to travel from the supervisory station along the outgoing line to the individual first repeater stations, through the associated first coupling networks and back to the supervisory station along the incoming line with the different travel times of the single test pulse from and back to the supervisory station via the different ones of the first repeater stations accounting for the spacing of the first pulses within said waveform, the producing of the second pulses comprising applying a single test pulse to the outgoing line at the supervisory station and deriving all the second pulses from such single test pulse by permitting the single test pulse to travel from the supervisory station along the outgoing line to the individual second repeater stations, through the associated second coupling networks and back to the supervisory station along the incoming line with the different travel times of the single test pulse from and back to the supervisory station via the different ones of the second repeater stations accounting for the spacing of the second pulses within said waveform, the fewer first pulses serving to facilitate counting of pulses in the waveform, the number of first and second pulses in the waveform being equal to the number of first and second repeater stations when no faults are present, when a fault is present the pulses missing from the waveform indicating which repeater stations are located beyond the fault.

2. The method defined in claim 1, the producing of the first pulses and the producing of the second pulses comprising using one and the same test pulse for deriving all the first pulses and all the second pulses.

3. The method defined in claim 2, the connecting of the first and second coupling networks comprising using two pluralities of coupling networks whose transfer functions differ from each other with respect to the amplitude attenuation to which test pulses are subjected.

4. The method defined in claim 1, the connecting of the first and second coupling networks comprising using two pluralities of coupling networks whose transfer functions differ from each other with respect to the amplitude attenuation to which test pulses are subjected.

5. The method defined in claim 4, the first coupling networks subjecting test pulses to less attenuation than the second coupling networks.

6. The method defined in claim 4, the second coupling networks subjecting test pulses to less attenuation than the first coupling networks.

7. The method defined in claim 1, the first coupling networks being filters having a first passband, the second coupling networks being filters having a second passband, the producing of the first pulses comprising utilizing as the single test pulse therefor a first test pulse having a first frequency lying within the first passband but outside the second passband and having a first amplitude, the producing of the second pulses comprising utilizing as the single test pulse therefor a second test pulse having a second frequency lying within the second passband but outside the first passband and having a second amplitude different from the first amplitude.

8. The method defined in claim 7, the first test pulse being of a first polarity and the second test pulse being of opposite second polarity.

9. The method defined in claim 7, the first test pulse being of a first polarity and the second test pulse being of opposite second polarity, the first pulses in said waveform being of a first polarity and the second pulses in said waveform being of opposite second polarity, further including the steps of subjecting the waveform to rectification and then displaying the waveform using an oscillograph.

10. The method defined in claim 1, the method including the steps of determining in the case of a fault which of those first repeater stations located intermediate the fault and the supervisory station is located farthest from the latter by determining which of the first pulses in said waveform is the last, then determining which of those second repeater stations located intermediate the fault and the supervisory station is located farthest from the latter by determining which of those second pulses following the last of the first pulses in said waveform is the last.

11. The method defined in claim 1, the method including the step of displaying said waveform using an oscillograph, the displaying comprising the first setting the horizontal sweep speed of the oscillograph to a value such that when no fault is present and said waveform contains one pulse for each repeater station in the system said waveform is displayed in its entirety, then when pulses are missing in said waveform determining which of the first pulses in said waveform is the last, then increasing the horizontal sweep speed of the oscillograph and displaying only the last of the first pulses and the adjoining second pulses.

12. The method defined in claim 1, the plurality of repeater stations consisting of p groups of repeater stations, each group consisting of one first repeater station and a plurality of adjoining second repeater stations, the method including the step of displaying said waveform using an oscillograph, the oscillograph having a horizontal deflection circuit and a horizontal sweep generator furnishing horizontal sweep signals in succession, the displaying comprising first setting the horizontal sweep frequency of the oscillograph to a value such that when no fault is present and said waveform contains one pulse for each repeater station in the system said waveform is displayed in its entirety, then when pulses are missing in said waveform determining that the $k$th group of pulses in the waveform is the first incomplete group of pulses, then increasing the horizontal sweep frequency by the factor $p$ and applying only the $k$th $(k+p)$th, $(k+2p)$th, etc., horizontal sweep signals to said horizontal deflection circuit of said oscillograph, to forn an expanded display of the imcomplete group of pulses.

13. In a four-wire two-way communications system comprised of a supervisory station, a four-wire transmission path leading away from the supervisory station, and a plurality of repeater stations spaced along the transmission path, the plurality of repeater stations being comprised of a lesser number of first repeater stations and a greater number of second repeater stations, the first repeater stations being interspersed among the second repeater stations, an arrangement for locating faults in the system, the arrangement comprising, in combination, at each first repeater station and connected between the outgoing and incoming lines a respective one of a plurality of first coupling networks each having the same first transfer function; at each second repeater station and connected between the outgoing and incoming lines a respective one of a plurality of second coupling networks each having the same second transfer function, different from the first transfer function; and waveform-producing means operative for producing a waveform comprised of first pulses and distinguishable second pulses, the first pulses being interspersed among the second pulses in correspondence to the interspersing of the first repeater stations among the second repeater stations, the waveform-producing means comprising means for producing all the first pulses from a single test pulse and all the second pulses from a single test pulse by applying such test pulse to the outgoing line at the supervisory station and permitting such test pulse to travel from the supervisory station along the outgoing line to the individual repeater stations, through the associated coupling networks and back to the supervisory station along the incoming line with the different travel times of such single test pulse from and back to the supervisory station via the different ones of the first repeater stations and via the different ones of the second repeater stations respectively accounting for the spacing of the first pulses within said waveform and for the spacing of the second pulses within said waveform, the fewer first pulses serving to facilitate counting of pulses in said waveform, the number of first and second pulses in the waveform being equal to the number of first and second repeater stations when no faults are present, when a fault is present the pulses missing from the waveform indicating which repeater stations are located beyond the fault.

14. The system defined in claim 13, the means for producing all the first pulses in the waveform from a single test pulse and all the second pulses in the waveform from a single test pulse being means for producing both the first and the second pulses in said waveform from one and the same test pulse.

15. The system defined in claim 14, the first and second transfer functions differing with respect to the amplitude attenuation to which test pulses transmitted through the respective coupling networks are subjected.

16. The system defined in claim 13, the first and second transfer functions differing with respect to the amplitude attenuation to which test pulses transmitted through the respective coupling networks are subjected.

17. The system defined in claim 16, the first coupling networks subjecting test pulses to less amplitude attenuation than the second coupling networks.

18. The system defined in claim 16, the first coupling networks subjecting test pulses to less amplitude attenuation than the second coupling networks.

19. The system defined in claim 13, the first coupling networks being filters having a first passband, the second coupling networks being filters having a second passband, the means for producing all the first pulses in said waveform from a single test pulse and all the second pulses in said waveform from a single test pulse comprising means for applying to the outgoing line at the supervisory station a first test pulse having a first frequency lying within the first passband but outside the second passband and having a first amplitude and a second test pulse having a second frequency lying within the second passband but outside the first passband and having a second amplitude different from the first amplitude for respectively producing the first pulses within said waveform and the second pulses within said waveform.

20. The system defined in claim 19, the first test pulse being of a first polarity and the second test pulse being of opposite second polarity.

* * * * *